United States Patent Office

3,127,379
Patented Mar. 31, 1964

3,127,379
NEW VULCANIZED ELASTOMERS DERIVED FROM ALPHA-OLEFIN POLYMERS AND METHODS FOR PRODUCING THE ELASTOMERS
Giulio Natta, Milan, Giovanni Crespi, Busto Arsizio, Varese, and Mario Bruzzone, Milan, Italy, assignors to Montecatini Societa Generale per l'Industria Mineraria e Chimica, a corporation of Italy
No Drawing. Filed Nov. 17, 1958, Ser. No. 774,133
Claims priority, application Italy Nov. 21, 1957
15 Claims. (Cl. 260—79.5)

This invention relates to vulcanized elastomers. More particularly, the invention relates to vulcanized elastomers from saturated, substantially amorphous alpha-olefin homopolymers and copolymers of the alpha-olefins with each other and with ethylene, and to methods for producing the vulcanized elastomers.

Unsaturated rubbers, particularly natural rubber, are generally vulcanized with sulfur or sulfur compounds capable of readily supplying sulfur to the polymer to form cross-links containing one or more sulfur atoms between the polymer chains. In practice, the vulcanization with sulfur or sulfur-releasing compound is carried out in the presence of various substances, such as accelerators, activators, plasticizers, etc. which facilitate the vulcanization and improve the properties of the vulcanized product.

It is possible to obtain good products by vulcanizing rubbers (natural rubber, butyl rubber, butadiene-styrene rubber) with sulfur because those polymers have the characteristics of readily adding sulfur.

The mechanism of the reactions which occur when natural rubber is vulcanized with sulfur have not been completely clarified. According to some explanations, the formation of a cross-link between two chains of the polymer takes place mainly by substitution of a sulfur radical for a hydrogen atom adjacent to a double bond in one of the chains, and by addition of the radical thus formed to the double bond of another polymer chain. The possibility of substituting a sulfur radical for a hydrogen atom is probably facilitated by the effect of the adjacent double bond in rendering the hydrogen atom particularly reactive.

Recently G. Natta and his co-inventors have disclosed new homopolymers and copolymers of the alpha-olefins $CH_2=CHR$ where R is a hydrocarbon, particularly copolymers of propylene with ethylene. The new homopolymers may be crystalline, partially crystalline, or amorphous, that is they may be substantially made up of macromolecules having the stereoregular isotactic structure for at least most of the principal chain; of macromolecules containing isotactic portions in stereoblocks; or of atactic macromolecules in which the R groups and H atoms attached to the asymmetric tertiary carbon atoms of succeeding monomeric units are randomly distributed on both sides of a plane, in which the macromolecule main chain may be arbitrarily fully extended. The copolymers may be partially crystalline or substantially amorphous.

The new linear homopolymers and cooplymers are substantially saturated and contain a large number of tertiary carbon atoms in the chain.

Attempts have been made heretofore to form cross-links consisting of one or more sulfur atoms between the chains of the linear, head-to-tail, substantially amorphous, substantially saturated alpha-olefin homopolymers and copolymers of Natta et al. as disclosed by them in the literature and in their pending applications Serial Nos. 514,097, 514,098, 514,099, 550,164 and 629,085. Such attempts were based on the theory that advantage could be taken of the reactivity of the hydrogen atoms bound to the tertiary carbon atoms to effect the reaction with sulfur under conditions, and with the aid of ingredients, normally used for vulcanising the high or low unsaturation rubbers.

Those attempts have not resulted in satisfactory vulcanized elastomers.

In fact, the saturated alpha-olefin polymers cannot be vulcanized directly under the conditions (temperature below 200° C.) used for vulcanizing rubber.

An object of this invention is to provide a method for producing vulcanized elastomers from the substantially amorphous and saturated alpha-olefin homopolymers and copolymers with sulfur or sulfur-releasing compounds.

This and other objects of the invention are accomplished by the present method which consists essentially of heating the alpha-olefin homopolymer or copolymer with sulfur or sulfur-releasing substances such as are used in vulcanizing rubber, at the relatively moderate temperature of 200 to 250° C., masticating the reaction product optionally in the presence of plasticizers, and finally vulcanizing the mass with the usual vulcanizing agents normally used for vulcanizing rubber, preferably in the presence of oxidizing agents, at temperatures below 200° C.

The linear, head-to-tail alpha-olefin polymers of Natta et al., such as atactic and isotactic polypropylene, and the linear copolymers of the alpha-olefins with ethylene react with sulfur at temperatures between 180° C. and 250° C., with development of $H_2S$ and the formation of double bonds in the chains which then, because of their unsaturation, become capable of adding sulfur and of being vulcanized under the same conditions used conventionally for vulcanizing rubbers.

The introduction of the unsaturation takes place without any substantial change in the linearity of the carbon atom chain.

The linear, head-to-tail polymers and copolymers are therefore very different from certain paraffins which react with sulfur only at very high temperatures of 300° C. to 400° C. to yield, as the result of complex, uncontrollable reactions which result in a substantial transformation of the paraffinic chains, reaction products which are not suitable for producing elastic rubbers even when the paraffin has a high molecular weight.

The reactions which occur between the saturated linear polymers and sulfur can comprise several successive stages as follows: addition of sulfur and formation of —S—SH groups with subsequent development of $H_2S$ resulting in the dehydrogenation of the polymer; or addition of sulfur and formation of —SH groups or of S—S linkages between different carbon atoms and possible limited degradation of the polymer due to disruption of the carbon-to-carbon bonds. While the mechanism of the reaction is not entirely clear at present, it does occur as shown by the evolution of $H_2S$ and the subsequent reactivity of the sulfurated alpha-olefin polymer in the vulcanization stage.

The linear alpha-olefin homopolymer or copolymer is mixed with from 1% to 15% of sulfur or sulfur-releasing substance such as $P_2S_5$ at temperatures generally below 100° C., and the mixture is then heated, preferably in a closed press, at a temperature of 180° C. to 250° C. until a spongy mass is obtained.

Usually, a portion of the sulfur initially mixed with the polymer does not react and, if desired, can be extracted from the mass by solvent for sulfur and the sulfur-releasing substances such as acetone, carbon disulfide, etc.

By carrying out the mixing in the presence of substances which act as catalysts, e.g., the metal oxides or sulfides such as zinc or lead oxide and molybdenum sulfide, the reaction of sulfur with development of H₂S is favored and the amount of sulfur combined with the polymer is increased. Preferably the mixing and heating are carried out is a closed vessel, such as a mixer or extruder provided with devices for removing gases, in order to eliminate the offensive smell of H₂S and avoid the possibility of toxic effects. The mixing and heating in the closed vessel can be carried out under suction. Reduced pressure favors the elimination of the offensive smell.

By varying the duration and temperature of the mixing it is possible to vary, over a wide range, the extent to which the substantially saturated linear starting alpha-olefin polymer becomes unsaturated, and its degree of reactivity in the subsequent vulcanization treatment. The method is therefore very versatile and can be used to produce final vulcanized elastomers having specifically different properties and suitable for specifically different uses.

The product obtained by heating the alpha-olefin homopolymer or copolymer with sulfur or a sulfur-releasing substance as described is not suitable for use as such due to the presence therein of irregularly distributed gas bubbles which considerably impair its mechanical and elastic properties.

Surprisingly, we find that the sulfuration product can be converted to a vulcanized elastomer having excellent properties by plasticizing and homogenizing it in a rubber mill, mixing it with the ingredients normally used in vulcanizing natural rubber with sulfur and with oxidizing agents or radical initiators having oxidizing action, and then vulcanizing the mixture under the conditions normally used for vulcanizing rubbers.

The usual oxidizing agents can be employed, including inorganic peroxides, p-quinondioxime plus lead dioxide, paradinitrosobenzene, "Polyac" (a polymeric p-dinitrosobenzene mixed with 75% mineral filler) or mixtures of such agents.

In addition to the usual vulcanizing agents, carbon black (e.g., channel or furnace carbon black) and other fillers which function as reinforcing agents for the vulcanized elastomers can be mixed with the plasticized alpha-olefin homopolymer or copolymer. The fillers commonly used with natural and synthetic rubber are suitable.

The sulfurated polymers can also be mixed with natural rubber (smoked sheet) or with synthetic rubber of various types, such as butyl rubber, and such mixtures can then be vulcanized with the usual rubber vulcanizing aids. A complete co-vulcanization can be obtained because of the high reactivity of the sulfurated alpha-olefin polymers. However, in the mixes of sulfurated polymer with natural or synthetic rubber it is necessary to use a sulfurated product which does not contain any substantial amount of unreacted sulfur, in order to avoid "scorching" of the rubber.

The amount of natural and/or synthetic rubber used can be from 10% to 90% by weight.

The vulcanized elastomers of the invention have satisfactory mechanical and elastic characteristics. In general, those properties of the present elastomers are at least as high as those of elastomers which can be obtained by sulfochlorinating the alpha-olefin polymers and then vulcanizing the sulfochlorination products, as described in pending applications of G. Natta et al. On the other hand, the present method of obtaining the final vulvanized elastomers has the advantage of utilizing the vulcanization conditions normally used for vulcanizing natural and synthetic rubbers and thus permits of the production of new elastomers from mixtures of the alpha-olefin polymers with natural or synthetic rubber. Since in the present method, sulfurated alpha-olefin polymers are vulcanized under the conventional rubber vulcanization conditions, it is possible to mix with those polymers small amounts of natural rubber which increase the tackiness of the alpha-olefin polymer and facilitate working up thereof in the unvulcanized state.

Moreover, it is possible, by the present method to obtain products comprising a layer of sulfurated alpha-olefin polymer, particularly of a sulfurated ethylene-propylene copolymer adhered to a layer of rubber. The sulfurated alpha-olefin polymer and rubber, after being separately mixed with the vulcanizing aids, can be deposited on each other in the form of superimposed layers, and the assembly thus obtained can then be vulcanized. In the resulting vulcanized laminate, the layers are firmly adhered to each other.

The elastomers obtained by co-vulcanization of butyl rubber and sulfurated copolymers of ethylene and propylene, with the agents normally used for vulcanizing butyl rubber, exihbit, in addition to a low unsaturation, rebound and dynamic properties which are better than those of vulcanized butyl rubber alone.

The following examples are given to illustrate specific embodiments of the invention and are not intended to be limiting.

*Example 1*

100 parts by weight of an ethylene-propylene copolymer containing 50% propylene by mols, and having a molecular weight of 350,000 are mixed with 10 parts by weight of sulfur in a roll mixer at 115° C. and the mixture is then heated to 250° C. for 30 minutes in closed molds in a press.

The resulting spongy product is extracted with acetone; the combined sulfur (not extractable with acetone) amounts to 1.48% by weight.

(a) The product thus extracted is plasticized in a roll mill at 60° C. and a mixture is then prepared in the following proportions:

| | Parts by weight |
|---|---|
| Sulfurated copolymer | 100 |
| Carbon black MPC (medium processing channel) | 40 |
| Zinc oxide | 5 |
| Stearic acid | 1 |
| Sulfur | 1 |
| TMTD (tetramethylthiuram disulfide) | 1 |
| Polyac | 1 |

The mix is vulcanized in a press at 160° C. for 30 minutes, thus obtaining a vulcanized product having the following characteristics:

| | | |
|---|---|---|
| Tensile strength | kg./cm.² | 170 |
| Elongation at break | percent | 385 |
| Modulus at 200% elongation | kg./cm.² | 71 |
| GID [1] at 18° C | | 71 |
| RE [2] at 18° C | percent | 54 |

[1] GID—International hardness degree.
[2] RE—Micro-rebound elasticity determined with a Pirelli apparatus of the type of the Healey rebound pendulum, with a height of fall of 0.125 mm. and an impact velocity of 5 cm./second.

(The data relating to the stress-elongation curve in this and in the following examples were obtained according to ASTM D-142-51T, with specimens of type D and a rate of separation of the grips of 50 mm./minute.)

(b) The product extracted is plasticized in a roll mill at 60° C. and a mixture is then prepared in the following proportions:

| | Parts by weight |
|---|---|
| Sulfurated copolymer | 100 |
| Carbon black MPC | 20 |
| Zinc oxide | 5 |
| Stearic acid | 1 |
| Sulfur | 1 |
| Zinc dithiocarbamate | 1 |
| Polyac | 1 |

The mix is vulcanized in a press at 160° C. for 30 minutes, thus obtaining a vulcanized product having the following characteristics:

| | |
|---|---|
| Tensile strength _____ kg./cm.$^2$ | 90 |
| Elongation at break _____ percent | 385 |
| Modulus at 200% elongation _____ kg./cm.$^2$ | 39 |
| RE at 18° C _____ percent | 62 |
| GID at 18° C _____ | 64.5 |

*Example 2*

The product reacted with sulfur and extracted with acetone as described in Example 1 is mixed with a butyl rubber (Polysar Butyl 100, with low unsaturation) in the ratio of 50:50 by weight. The product is then mixed with the vulcanization ingredients according to the following recipe:

| | Parts by weight |
|---|---|
| Sulfurated copolymer-butyl rubber mixture | 100 |
| Carbon black MPC | 40 |
| Zinc oxide | 5 |
| Stearic acid | 1 |
| Sulfur | 1 |
| TMTD | 1 |
| Polyac | 1 |

The mix is vulcanized in a press at 160° C. for 30 minutes, thus obtaining a vulcanized product having the following characteristics:

| | |
|---|---|
| Tensile strength _____ kg./cm.$^2$ | 207 |
| Elongation at break _____ percent | 565 |
| Modulus at 200% elongation _____ kg./cm.$^2$ | 36 |
| RE at 18° C _____ percent | 33 |
| GID at 18° C _____ | 59.5 |

*Example 3*

100 parts by weight of an ethylene-propylene copolymer containing 43% by mols propylene and having a molecular weight of 200,000 are mixed in a roll mixer at 60° C. with 10 parts by weight of sulfur and the mixture is then heated in a closed mold press at 250° C. for 30 minutes.

(a) The product obtained is plasticized in a roll mill at 60° C. and then mixed with natural rubber (smoked sheet) to obtain a 50:50 mixture by weight. The product is then mixed with the vulcanization ingredients according to the following recipe:

| | Parts by weight |
|---|---|
| Sulfurated copolymer-natural rubber mixture | 100 |
| Zinc oxide | 5 |
| Stearic acid | 1 |
| Benzothiazyldisulfide | 1 |
| Phenylbetanaphthylamine | 1 |

The mix is vulcanized in a press at 140° C. for 20 minutes thus obtaining a product having the following characteristics:

| | |
|---|---|
| Tensile strength _____ kg./cm.$^2$ | 115 |
| Elongation at break _____ percent | 730 |
| Modulus at 200% elongation _____ kg./cm.$^2$ | 15 |
| GID at 18° C _____ | 46 |
| RE at 20° C _____ percent | 77 |

(b) The product obtained is plasticized in a roll mill at 60° C. and then mixed with natural rubber (smoked sheet) to obtain a mixture containing 75 parts natural rubber and 25 parts sulfurated copolymer (by weight). The product is mixed with the vulcanization ingredients according to the following recipe:

| | Parts by weight |
|---|---|
| Sulfurated copolymer-natural rubber mixture | 100 |
| Zinc oxide | 2.5 |
| Stearic acid | 0.5 |
| Benzothiazyldisulfide | 0.5 |
| Phenylbetanaphthylamine | 0.5 |

The mix is vulcanized in a press at 140° C. for 20 minutes, thus obtaining a vulcanized product having the following characteristics:

| | |
|---|---|
| Tensile strength _____ kg./cm.$^2$ | 156 |
| Elongation at break _____ percent | 860 |
| Modulus at 200% elongation _____ kg./cm.$^2$ | 8 |

*Example 4*

100 parts by weight of an ethylene-propylene copolymer containing 43% by mols propylene and having a molecular weight of 200,000 are mixed with 10 parts by weight sulfur in a roll mill at 60° C. and the mixture is then heated to 250° C. in a closed mold press for 30 minutes.

(a) 100 parts of the spongy mass thus obtained are plasticized in a roll mill at 60° C., and 10 parts calcium peroxide, containing 80% active oxygen, are then added and mixing is continued until the mixture is homogeneous. This is then vulcanized in a press at 160° C. for 30 minutes, thus obtaining a vulcanized product having the following characteristics:

| | |
|---|---|
| Tensile strength _____ kg./cm.$^2$ | 40 |
| Elongation at break _____ percent | 680 |
| Modulus at 200% elongation _____ kg./cm.$^2$ | 11 |
| GID at 18° C _____ | 54 |
| RE at 20° C _____ percent | 65 |

(b) 100 parts of the spongy mass are mixed in a roll mill at 60° C. with 5 parts zinc oxide and 1.5 parts paraquinondioxime, until a homogeneous mixture is obtained. This is vulcanized in a press at 160° C. for 30 minutes, thus obtaining a rubber having the following characteristics:

| | |
|---|---|
| Tensile strength _____ kg./cm.$^2$ | 40 |
| Elongation at break _____ percent | 490 |
| Modulus at 200% elongation _____ kg./cm.$^2$ | 15 |
| GID at 18° C _____ | 53 |
| RE at 20° C _____ percent | 70 |

(c) 100 parts of the spongy mass are mixed in a roll mill at 70° C. with 1.75 parts paraquinondioxime, 1.1 parts dibenzo-p-quinondioxime, 8.5 parts Pb$_3$O$_4$, 1.25 parts ZnO, 0.25 part stearic acid, until a homogeneous mixture is obtained. This is vulcanized in a press at 170° C. for 15 minutes, thus obtaining a rubber having the following characteristics:

| | |
|---|---|
| Tensile strength _____ kg./cm.$^2$ | 50 |
| Elongation at break _____ percent | 400 |
| Modulus at 200% elongation _____ kg./cm.$^2$ | 23 |
| GID at 18° C _____ | 56 |
| RE at 20° C _____ percent | 70 |

(d) The spongy mass obtained as described above is extracted with acetone to remove the excess of unreacted sulfur. The polymer, after extraction, contains 1.5% by weight of chemically combined sulfur. 100 parts of the sulfurated polymer thus obtained are mixed in a roll mill at 60° C. with 10 parts Polyac until a homogeneous mixture is obtained. This mixture is vulcanized in a press at 160° C. for 30 minutes, thus obtaining a rubber having the following characteristics:

| | |
|---|---|
| Tensile strength _____ kg./cm.$^2$ | 65 |
| Elongation at break _____ percent | 480 |
| Modulus at 200% elongation _____ kg./cm.$^2$ | 23 |
| GID at 18° C _____ | 50 |
| RE at 20° C _____ percent | 74 |

*Example 5*

100 parts by weight of an ethylene-propylene copolymer containing 45% by mols of propylene and having a molecular weight of 200,000, are mixed in a roll mill at 60° C. with 5 parts by weight of sulfur and the mixture is then heated in a press at 250° C. for 15 minutes. 100 parts of the spongy mass thus obtained are mixed in a roll mill at 60° C. with 30 parts zinc oxide, 6 parts cumyl hydroperoxide, 3.5 parts diphenylguanidine (as an activator for the hydroperoxide) until a homogeneous mixture is obtained.

This mixture is vulcanized in a press at 160° C. for 30 minutes, thus obtaining a rubber having the following characteristics:

Tensile strength _____kg./cm.² __ 54
Elongation at break _____percent __ 430
Modulus at 200% elongation _____kg./cm.² __ 23

*Example 6*

100 parts by weight of an ethylene-propylene copolymer, containing 43% by mols of propylene and having a molecular weight of 200,000 are mixed with 10 parts by weight of $P_2S_5$ in a roll mill at 60° C. and the mixture is heated to 250° C. for 15 minutes in a closed mold press. 100 parts of the spongy mass thus obtained are mixed with 15 parts Polyac and 10 parts ZnO and the whole is vulcanized in a press at 160° C. for 30 minutes. The vulcanized product obtained has the following characteristics:

Tensile strength _____kg./cm.² __ 56
Elongation at break _____percent __ 310
Modulus at 200% elongation _____kg./cm.² __ 38
GID at 18° C _____ 61.5
RE at 20° C _____percent __ 70

The foregoing examples were duplicated except that linear, head-to-tail atactic homopolymers of the alpha-olefins, particularly of propylene and butene-1 were used as starting materials. The results obtained were similar to those reported in the examples, except that the vulcanized elastomers derived from the atactic, substantially amorphous substantially saturated homopolymers had somewhat lower rebound values.

When linear, head-to-tail partially crystalline homopolymers of the alpha-olefins, such as polypropylene and polybutene-1 containing isotactic portions in stereoblocks are used as starting materials in the present method, the crystallinity of the polymers is reduced or entirely eliminated by the sulfuration.

The starting material for the present method may be homopolymers of the alpha-olefins of formula $CH_2=CHR$ where R contains from 1 to 8 carbon atoms, copolymers of the alpha-olefins with each other, or copolymers of the alpha-olefins with ethylene.

The preferred starting materials are the atactic (amorphous) homopolymers of the alpha-olefins, and the substantially pure and amorphous ethylene-propylene copolymers disclosed in the pending application of Natta et al., Ser. No. 629,085, which copolymers contain from 5% to 70%, preferably from 30% to 70% of ethylene by weight in the copolymer molecule and have molecular weights above 20,000.

The foregoing examples clearly demonstrate the effectiveness of the present method and the desirable characteristics of the vulcanized elastomers obtained. Obviously some variations can be made. It is intended to include in the scope of the appended claims all such modifications and changes which may be apparent to those skilled in the art from the disclosures and examples given herein.

What is claimed is:

1. A process for producing vulcanized elastomers, which process comprises heating a high molecular weight linear, substantially amorphous and saturated polymer selected from the group consisting of homopolymers of alpha-olefins having the formula $CH_2=CHR$ in which R is a hydrocarbon, copolymers of said alpha-olefins with each other, and copolymers of said alpha-olefins with 5 to 70% by weight of ethylene in the presence of from 1% to 15% by weight of sulfur, said sulfur being the only reactive ingredient at a temperature between 180° C. and 250° C. until the saturated polymer is converted to an unsaturated polymer containing reactive double bonds in the main chain and a homogeneous spongy mass comprising the unsaturated polymer is obtained, and then vulcanizing the unsaturated polymer by heating the spongy mass at a temperature below 200° C.

2. New vulcanized elastomers obtained by sulfurating, wherein sulfur is the only reactive ingredient, a high molecular weight, linear, substantially amorphous and saturated polymer selected from the group consisting of homopolymers of alpha-olefins having the formula $$CH_2=CHR$$

wherein R is a hydrocarbon, copolymers of said alpha-olefins with each other, and copolymers of ethylene and said alpha-olefins containing 5% to 70% by weight of ethylene in the copolymer macromolecule, to convert the saturated polymer to an unsaturated polymer the main chain of which contains reactive double bonds, and then heating the sulfurated product comprising the unsaturated polymer at a temperature below 200° C., under vulcanizing conditions, to vulcanize the unsaturated polymer.

3. New vulcanized elastomers obtained from a high molecular weight, linear, substantially amorphous and saturated homopolymer of an alpha-olefin in accordance with claim 2.

4. New vulcanized elastomers obtained from a high molecular weight, linear, substantially amorphous and saturated copolymer of ethylene and propylene containing 5% to 70% by weight of ethylene in the copolymer macromolecule, in accordance with claim 2.

5. New vulcanized elastomers obtained by sulfurating, wherein sulfur is the only reactive ingredient, a high molecular weight, linear, substantially amorphous and saturated homopolymer of an alpha-olefin having the formula $CH_2=CHR$ wherein R is a hydrocarbon, to convert the saturated homopolymer to an unsaturated polymer the main chain of which contains reactive double bonds, and then mixing the sulfurated product comprising the unsaturated polymer with from 10% to 90% by weight of an unsaturated rubber, and heating the mixture at a temperature below 200° C. under vulcanizing conditions.

6. New vulcanized elastomers obtained according to claim 13, and wherein the saturated polymer is a copolymer of ethylene and propylene containing 5% to 70% by weight of ethylene in the copolymer macromolecule.

7. New vulcanized elastomers obtained according to claim 15, wherein the saturated polymer is a copolymer of ethylene and propylene containing 5% to 70% by weight of ethylene in the copolymer macromolecule and the unsaturated rubber is butyl rubber, and the vulcanized product is a rubber having lower unsaturation and better rebound and dynamic properties than vulcanized butyl rubber alone.

8. The process of claim 1, wherein the saturated polymer is heated in the presence of sulfur released by $P_2S_5$ admixed with said saturated polymer.

9. The process according to claim 1, characterized in that the saturated polymer is heated in the presence of sulfur and of a catalyst for the reaction between the polymer and sulfur selected from the group consisting of zinc oxide, lead oxide, and molybdenum sulfide.

10. The process according to claim 1, characterized in that prior to heating thereof, the spongy mass is extracted with a solvent for sulfur to remove any unreacted sulfur therefrom.

11. The process according to claim 1, characterized in that the spongy mass is vulcanized in the presence of an inorganic oxidizing agent selected from the group consisting of alkali metal and alkaline earth metal peroxides.

12. The process according to claim 1, characterized in that the unsaturated polymer is vulcanized by heating the spongy mass in the presence of an organic oxidizing agent selected from the group consisting of aromatic dinitrosocompounds, organic peroxides, organic hydroperoxides, mixtures of quinone dioximes with inorganic oxides, and mixtures of quinone dioximes with inorganic peroxides.

13. The process according to claim 1, characterized in that the saturated polymer is a copolymer of ethylene and propylene.

14. The process according to claim 1, characterized in that the sulfurated alpha-olefin polymer is mixed with an unsaturated rubber prior to vulcanization.

15. The process according to claim 1, characterized in that the polymeric material is a copolymer of ethylene and propylene, and the sulfurated copolymer is mixed with an unsaturated rubber prior to the vulcanization.

References Cited in the file of this patent

UNITED STATES PATENTS

| | | |
|---|---|---|
| 2,748,104 | Viohl | May 29, 1956 |
| 2,890,187 | Bowman et al. | June 9, 1959 |
| 2,906,725 | Briggs et al. | Sept. 29, 1959 |
| 2,920,062 | McFarland | Jan. 5, 1960 |
| 2,983,714 | Robinson et al. | May 9, 1961 |
| 3,012,016 | Kirk et al. | Dec. 5, 1961 |